(12) United States Patent
Li et al.

(10) Patent No.: US 11,713,820 B2
(45) Date of Patent: Aug. 1, 2023

(54) SEAL SWITCHING MECHANISM

(71) Applicant: GUANGZHOU SEAGULL KITCHEN AND BATH PRODUCTS CO., LTD., Guangzhou (CN)

(72) Inventors: Zhiyong Li, Xiamen (CN); Jianxin Li, Xiamen (CN)

(73) Assignee: GUANGZHOU SEAGULL KITCHEN AND BATH PRODUCTS CO., LTD., Guangzhou (CN)

( * ) Notice: Subject to any disclaimer, the term of this patent is extended or adjusted under 35 U.S.C. 154(b) by 131 days.

(21) Appl. No.: 17/446,158

(22) Filed: Aug. 26, 2021

(65) Prior Publication Data

US 2022/0074508 A1 Mar. 10, 2022

(30) Foreign Application Priority Data

Sep. 10, 2020 (CN) .......................... 202021964238.3

(51) Int. Cl.
| | | |
|---|---|---|
| *F16K 11/044* | (2006.01) | |
| *F16K 1/46* | (2006.01) | |
| *B05B 1/18* | (2006.01) | |
| *B05B 1/16* | (2006.01) | |
| *B05B 1/30* | (2006.01) | |

(52) U.S. Cl.
CPC .......... *F16K 11/044* (2013.01); *B05B 1/1618* (2013.01); *B05B 1/18* (2013.01); *B05B 1/3013* (2013.01); *F16K 1/46* (2013.01)

(58) Field of Classification Search
CPC ......... B05B 1/1618; B05B 1/18; B05B 1/185; B05B 1/3013; F16K 1/46; F16K 11/044; E03C 1/084
See application file for complete search history.

(56) References Cited

U.S. PATENT DOCUMENTS

| | | | | |
|---|---|---|---|---|
| 4,629,124 A | * | 12/1986 | Gruber ................... | B05B 7/0425 239/447 |
| 5,145,114 A | * | 9/1992 | Monch ................... | B05B 1/1618 239/447 |
| 5,383,604 A | * | 1/1995 | Boesch ................. | B05B 1/1618 239/447 |
| 5,707,011 A | * | 1/1998 | Bosio ..................... | B05B 15/65 239/447 |
| 10,066,374 B2 | * | 9/2018 | Wu ........................ | F16K 31/528 |

(Continued)

*Primary Examiner* — Darren W Gorman
(74) *Attorney, Agent, or Firm* — Platinum Intellectual Property PC

(57) ABSTRACT

The disclosure relates to faucet showers and discloses a seal switching mechanism including a seal switching mechanism, which includes a water shunt valve body, a valve shaft provided in an inner middle position of water shunt valve body and elastically connected with an inner bottom end of water shunt valve body, a valve body, a first water outlet channel, a first water outlet, a bubbler, a face cover, a spring, a gasket, a lower sealing port, an upper sealing port located above lower sealing port, a second water outlet, a second water outlet channel, and an assembly groove provided at a lower part of valve shaft. The upper and lower sealing port are arranged inside water shunt valve body, and gasket is installed inside assembly groove. The gasket adopts a special-shaped gasket with a step, which solves switching seal problem of switch sealing ports with different diameters on both sides.

5 Claims, 3 Drawing Sheets

(56) References Cited

U.S. PATENT DOCUMENTS

| | | | |
|---|---|---|---|
| 2009/0200400 A1* | 8/2009 | Lin | B05B 1/1618 |
| | | | 239/391 |
| 2016/0091100 A1* | 3/2016 | Chen | E03C 1/08 |
| | | | 137/625 |
| 2017/0342692 A1* | 11/2017 | Hu | B05B 15/65 |
| 2019/0224694 A1* | 7/2019 | Wang | B05B 1/3013 |

* cited by examiner

SEAL SWITCHING MECHANISM

TECHNICAL FIELD

The disclosure relates to the field of faucet showers, and more particularly to a seal switching mechanism.

BACKGROUND

In the existing faucet showers on the market, a sealing gasket in two water paths of an water inlet switch valve body is usually a regular flat gasket, and two switch sealing ports using the flat gasket need to have the same diameter. However, when the diameter of the sealing port of one of the two water paths is different (need to increase or decrease), the flat gasket is not available.

SUMMARY

To solve the problem mentioned above, the present disclosure provides a seal switching mechanism, which can solve the problem of switching seal of switch sealing ports with different diameters on both sides, and has an ideal sealing effect.

In order to achieve the above object, the technical solutions provided by the disclosure are as follows.

A seal switching mechanism, which comprises a seal switching mechanism, wherein the seal switching mechanism comprises a water shunt valve body, a valve shaft, a valve body, a first water outlet channel, a first water outlet, a bubbler, a face cover, a spring, a gasket, a lower sealing port, an upper sealing port, a second water outlet, a second water outlet channel and an assembly groove; wherein the upper sealing port and the lower sealing port are respectively arranged inside the water shunt valve body, the upper sealing port is located above the lower sealing port, the valve shaft is provided in an inner middle position of the water shunt valve body, the valve shaft and an inner bottom end of the water shunt valve body are elastically connected through the spring, the assembly groove is provided at a lower part of the valve shaft, the gasket is installed inside the assembly groove, the valve body is connected to an upper part of the inside of the water shunt valve body, a top end of the valve shaft penetrates the valve body and extends above the valve body, the face cover is threadedly connected to one side of the water shunt valve body, the first water outlet channel is formed between an upper part of the face cover and the water shunt valve body, the outer edge circumference of the face cover is uniformly distributed with a plurality of first water outlets disposed in fluid communication with the first water outlet channel, the bubbler is threadedly connected inside the face cover, the second water outlet channel is formed between the bubbler and the water shunt valve body, and an inner part of the bubbler is provided with a plurality of second water outlets disposed in fluid communication with the second water outlet channel.

Preferably, the gasket is a trapezoidal structure.

Preferably, the assembly groove is provided with an oblique gap.

Preferably, a V-type sealing ring is arranged between the valve shaft and the valve body.

Preferably, small O-type sealing rings are provided between upper and lower sides of the valve body and the water shunt valve body, and between a side of the face cover close to the water shunt valve body and the water shunt valve body.

Preferably, a large O-type sealing ring is arranged between a side of the face cover away from the water shunt valve body and the water shunt valve body.

Preferably, the seal switching mechanism further comprises: a faucet shower housing and a switch, wherein the faucet shower housing is located outside the seal switching mechanism, the switch is connected with a top middle position of the faucet shower housing, and the bottom of the switch is in contact with the top of the valve shaft.

The disclosure includes at least the following substantial improvements and beneficial effects.

1. The gasket of the disclosure adopts a special-shaped gasket with a step, which can solve the problem of switching seal of switch sealing ports with different diameters on both sides.

2. In the disclosure, a gap is designed between the gasket and the assembly groove, which can make the gasket freely deform up and down under a low water pressure and adhere to a sealing mating face between the gasket and external parts to achieve an ideal sealing effect.

REFERENCE SIGNS

1: a faucet shower housing, 2: a switch, 3: a seal switching mechanism, 31: a water shunt valve body, 32: a valve shaft, 33: a V-type sealing ring, 34: a valve body, 35: a first water outlet channel, 36: a large O-type sealing ring, 37: a first water outlet, 38: a bubbler, 39: a face cover, 40: small O-type sealing rings, 41: a spring, 42: a gasket, 43: a lower sealing port, 44: an upper sealing port, 45: a second water outlet, 46: a second water outlet channel, and 47: an assembly groove.

DETAILED DESCRIPTION

The following will clearly and completely describe the technical solutions in the embodiments of the present disclosure with reference to the accompanying drawings in the embodiments of the present disclosure. Obviously, the described embodiments are only a part of the embodiments of the present disclosure, instead of all of the embodiments. Based on the embodiments of the present disclosure, all other embodiments obtained by those of ordinary skill in the art without creative work shall fall within the protection scope of the present disclosure.

Figure 1:
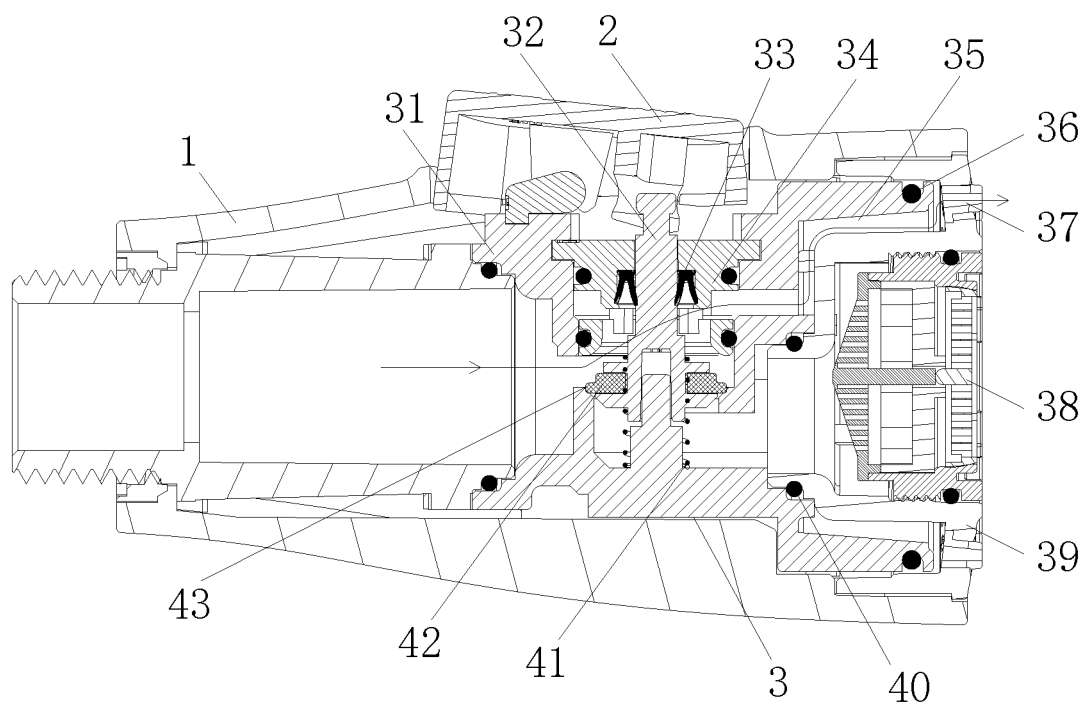
FIG. 1 is a sectional diagram of the faucet shower switch according to the disclosure in a pressed state.
Figure 2:
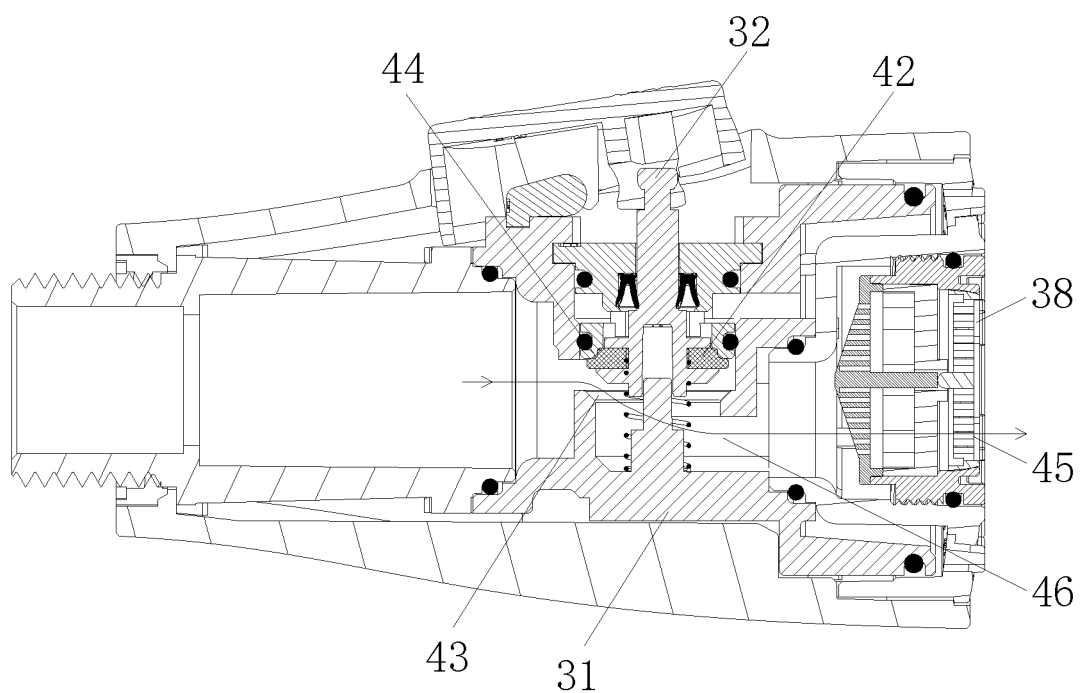
FIG. 2 is a sectional diagram of the faucet shower switch according to the disclosure in a unpressed state.
Figure 3:
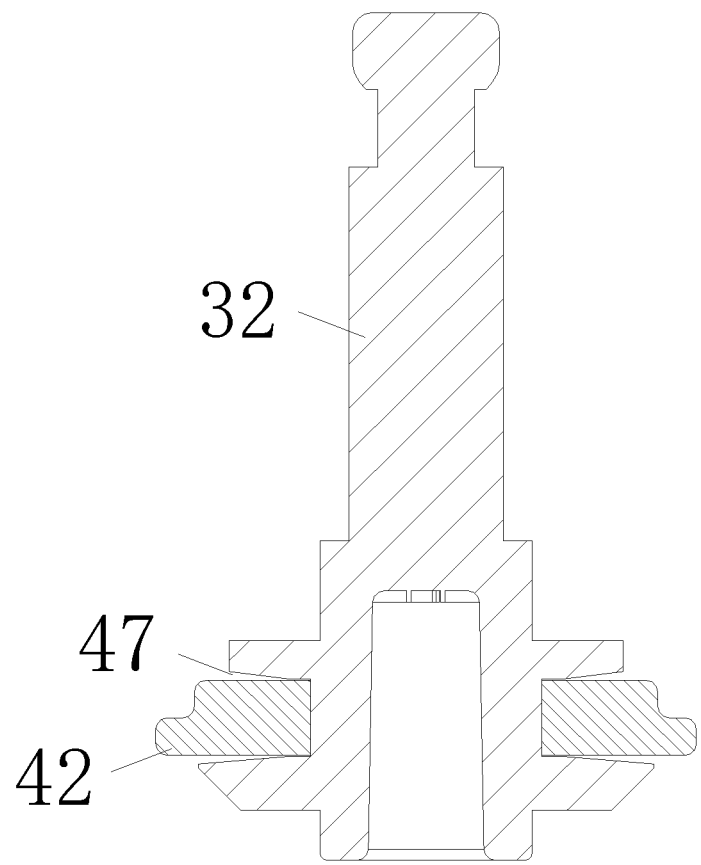
FIG. 3 is a partial sectional diagram according to the disclosure.
Figure 4:
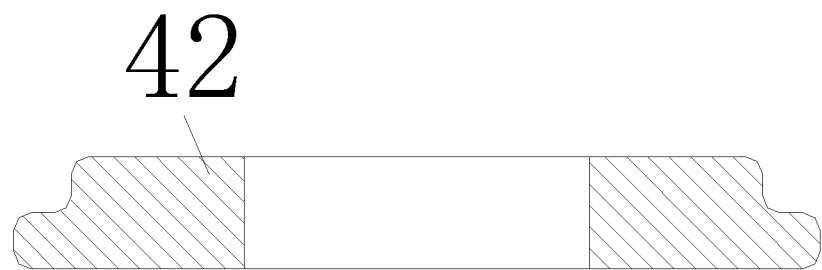
FIG. 4 is a sectional diagram of the gasket according to the disclosure.
Figure 5:
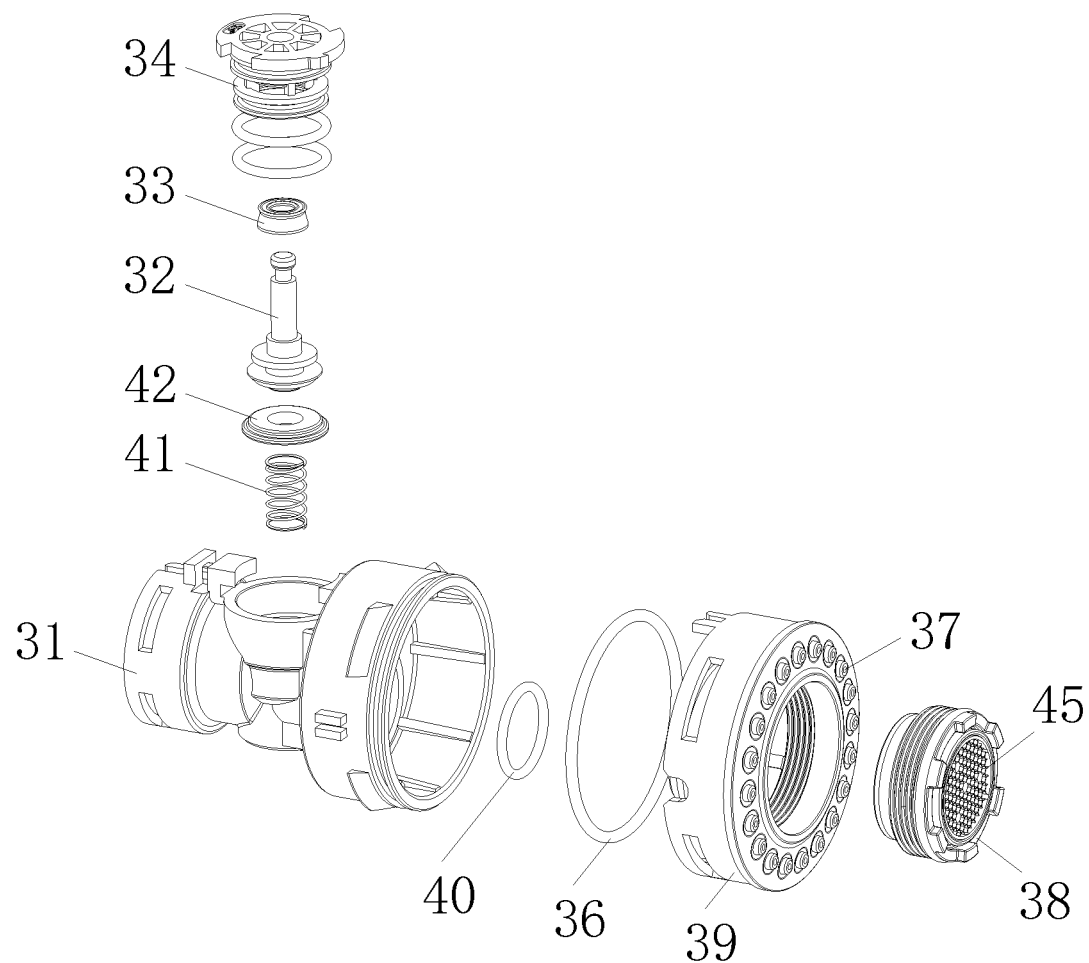
FIG. 5 is an exploded diagram of the seal switching mechanism according to the disclosure.

As shown in FIG. 1-FIG. 5, the technical solution of the disclosure is as follow. A seal switching mechanism, which comprises a seal switching mechanism 3. The seal switching mechanism 3 comprises a water shunt valve body 31, a valve shaft 32, a valve body 34, a first water outlet channel 35, a first water outlet 37, a bubbler 38, a face cover 39, a spring 41, a gasket 42, a lower sealing port 43, an upper sealing port 44, a second water outlet 45, a second water outlet channel 46 and an assembly groove 47. The upper sealing port 44 and the lower sealing port 43 are respectively arranged inside the water shunt valve body 31, the upper sealing port 44 is located above the lower sealing port 43, the valve shaft 32 is provided in an inner middle position of the water shunt valve body 31, the valve shaft 32 and an inner bottom end of the water shunt valve body 31 are elastically connected through the spring 41, the assembly groove 47 is provided at a lower part of the valve shaft 32, the gasket 42 is installed inside the assembly groove 47, the valve body 34 is connected to an upper part of the inside of the water shunt valve body 31, a top end of the valve shaft 32 penetrates the valve body 34 and extends above the valve body 34, the face cover 39 is threadedly connected to one side of the water shunt valve body 31, the first water outlet channel 35 is formed between an upper part of the face cover 39 and the water shunt valve body 31, the outer edge circumference of the face cover 39 is uniformly distributed with a plurality of first water outlets 37 disposed in fluid communication with the first water outlet channel 35, the bubbler 38 is threadedly connected inside the face cover 39, the second water outlet channel 46 is formed between the bubbler 38 and the water shunt valve body 31, and an inner part of the bubbler 38 is provided with a plurality of second water outlets 45 disposed in fluid communication with the second water outlet channel 46.

Specifically, the gasket 42 is a trapezoidal structure.

The above technical solution can improve the sealing performance between the gasket 42 and the upper sealing port 44, and between the gasket 42 and the lower sealing port 43.

Specifically, the assembly groove 47 is provided with an oblique gap.

By adopting the above technical solution, when sealing, the gasket 42 will be slightly adjusted up and down to better adapt to sealing ports and achieve a better sealing effect.

Specifically, a V-type sealing ring 33 is arranged between the valve shaft 32 and the valve body 34.

The above technical solution can improve the sealing performance between the valve shaft 32 and the valve body 34.

Specifically, small O-type sealing rings 40 are provided between upper and lower sides of the valve body 34 and the water shunt valve body 31, and between a side of the face cover 39 close to the water shunt valve body 31 and the water shunt valve body 31.

The above technical solution can improve the sealing performance between the valve body 34 and the water shunt valve body 31, and between the outside of the face cover 39 and the inside of the water shunt valve body 31.

Specifically, a large O-type sealing ring 36 is arranged between a side of the face cover 39 away from the water shunt valve body 31 and the water shunt valve body 31.

The above technical solution can improve the sealing performance between the inside of the face cover 39 and the outside of the water shunt valve body 31.

Specifically, the seal switching mechanism 3 further comprises: a faucet shower housing 1 and a switch 2. The faucet shower housing 1 is located outside the seal switching mechanism 3, the switch 2 is connected with a top middle position of the faucet shower housing 1, and the bottom of the switch 2 is in contact with the top of the valve shaft 32.

By adopting the above technical solution, the switch 2 drives the valve shaft 32 to move up and down, and the valve shaft 32 drives the gasket 42 to move up and down, thereby blocking the upper sealing port 44 or the lower sealing port 43, and realizing switching of water paths.

The working principle and operation process of the disclosure are as follow. The switch 2 is pressed, the valve shaft 32 moves downward, the gasket 42 seals the lower sealing port 43, the water flows through the first water outlet channel 35, and flows out from the first water outlet 37. The switch 2 is pressed again, the valve shaft 32 moves upward, the gasket 42 seals the upper sealing port 44, the water flows through the second water outlet channel 46 and flows out from the second water outlet 45.

Since the diameters of the upper sealing port 44 and the lower sealing port 43 are different, the gasket 42 with trapezoidal structure has a better sealing effect.

A slightly oblique gap is provided on the assembly groove 47 of the valve shaft 32, so that, when sealing, the gasket 42 will be slightly adjusted up and down to better adapt to the upper sealing port 43 or the lower sealing port 44 to achieve a better sealing effect.

Although the embodiments of the present disclosure have been shown and described, those of ordinary skill in the art can understand that various changes, modifications, replacements and variations can be made to these embodiments without departing from the principle and spirit of the present disclosure, and the scope of the present disclosure is defined by the appended claims and their equivalents.

What is claimed is:

1. A seal switching mechanism which comprises a seal switching mechanism (3), wherein the seal switching mechanism (3) comprises a water shunt valve body (31), a valve shaft (32), a valve body (34), a first water outlet channel (35), a first water outlet (37), a bubbler (38), a face cover (39), a spring (41), a gasket (42), a lower sealing port (43), an upper sealing port (44), a second water outlet (45), a second water outlet channel (46) and an assembly groove (47); wherein the upper sealing port (44) and the lower sealing port (43) are respectively arranged inside the water shunt valve body (31), the upper sealing port (44) is located above the lower sealing port (43), the valve shaft (32) is provided in an inner middle position of the water shunt valve body (31), the valve shaft (32) and an inner bottom end of the water shunt valve body (31) are elastically connected through the spring (41), the assembly groove (47) is provided at a lower part of the valve shaft (32), the gasket (42) is installed inside the assembly groove (47), the valve body (34) is connected to an upper part of the inside of the water shunt valve body (31), a top end of the valve shaft (32) penetrates the valve body (34) and extends above the valve body (34), the face cover (39) is threadedly connected to one side of the water shunt valve body (31), the first water outlet channel (35) is formed between an upper part of the face cover (39) and the water shunt valve body (31), the outer edge circumference of the face cover (39) is uniformly distributed with a plurality of first water outlets (37) disposed in fluid communication with the first water outlet channel (35), the bubbler (38) is threadedly connected inside the face cover (39), the second water outlet channel (46) is formed between the bubbler (38) and the water shunt valve body (31), and an inner part of the bubbler (38) is provided with a plurality of second water outlets (45) disposed in fluid communication with the second water outlet channel (46);

wherein the gasket (42) is a trapezoidal structure, and the assembly groove (47) is provided with an oblique gap.

2. The seal switching mechanism according to claim 1, wherein a V-type sealing ring (33) is arranged between the valve shaft (32) and the valve body (34).

3. The seal switching mechanism according to claim 1, wherein small O-type sealing rings (40) are provided between upper and lower sides of the valve body (34) and the water shunt valve body (31), and between a side of the face cover (39) close to the water shunt valve body (31) and the water shunt valve body (31).

4. The seal switching mechanism according to claim 1, wherein a large O-type sealing ring (36) is arranged between a side of the face cover (39) away from the water shunt valve body (31) and the water shunt valve body (31).

5. The seal switching mechanism according to claim 1, further comprises a faucet shower housing (1) and a switch (2), wherein the faucet shower housing (1) is located outside the seal switching mechanism (3), the switch (2) is connected with a top middle position of the faucet shower housing (1), and the bottom of the switch (2) is in contact with the top of the valve shaft (32).

\* \* \* \* \*